Patented Nov. 13, 1934

1,980,829

UNITED STATES PATENT OFFICE 1,980,829

PURIFICATION AND REGENERATION OF PLATINUM CATALYSTS

Earl S. Ridler, Shaker Heights, Ohio, assignor to The Grasselli Chemical Company, Cleveland, Ohio, a corporation of Delaware No Drawing. Application June 22, 1933, Serial No. 677,175

5 Claims. (Cl. 23—238)

The present invention relates to the purification and regeneration of supported platinum catalysts, that is to say contact masses in which the active platinum is deposited, supported, or carried, upon an inert carrier and consists in treating the spent platinum catalyst masses with a liquid preparation of a volatile reducing agent.

Platinum catalysts in which platinum is deposited or supported on an inert carrier are used mainly in gas phase reactions of which the oxidation of $SO_2$ to $SO_3$ in the manufacture of sulfuric acid is the most important application of supported platinum catalysts. Such catalysts are used to some extent in other gas phase reactions such as the oxidation of methanol to formaldehyde, the oxidation of acetaldehyde to acetic acid, the reduction of pyridine to piperidine, the reduction of acetylene homologues, the reduction of acid chlorides, etc.

My present invention is primarily intended and particularly applicable to the regeneration or reactivation of platinum contact masses for use in the manufacture of sulfuric acid but it can also be used for treating spent platinum masses which have become inactive in other gas phase reactions.

Supported platinum contact masses used in various oxidation and reduction reactions do not have an indefinite economical activity and must from time to time be regenerated or reactivated.

The regeneration process heretofore exclusively used, as far as I know, consists in removing the spent masses from the reaction converter, screening out dust and scale, spraying the mass with a solution of aqua regia and then replacing the mass in the converter. The active period of such a regenerated mass becomes shorter and shorter between successive regenerations and it must finally be reworked to recover the platinum and a new mass installed in the converters.

I have found that by treatment of spent platinum catalysts with solutions, for instance aqueous, alcoholic or solutions in other volatile solvents, of various organic and inorganic reducing agents the activity of the masses is substantially restored and that the so reactivated, purified, or regenerated catalysts can be successfully re-used in the sulfuric acid contact process and other gas phase reactions.

It is necessary for the successful performance of my invention that the reducing agent as well as the solvent which may be used in connection with such agent be completely volatile or leave no residue on the catalysts when the treated catalysts are heated prior to their use in the gas phase reaction for which they are intended. Efficient reducing agents useful in my novel process are, for instance, allyl alcohol, acrolein, aldehydes such as formaldehyde, acetaldehyde, benzaldehyde and their volatile homologues, among inorganic reducing agents useful in my invention I might mention hydroxylamine, hydrazine and the latter's organic derivatives such as phenyl-hydrazine.

Volatile reducing agents which are liquid at ordinary temperatures, such as for instance propionaldehyde or butyraldehyde, etc. can be used as such for treatment and impregnation of spent contact masses. Other reducing agents are preferably used in solutions of volatile solvents, such as water, alcohol, acetone, etc.

In the performance of my invention I impregnate the spent catalyst with a liquid preparation of the desired reducing agent; if necessary I separate the catalyst from the excess liquid and finally remove the treating agent from the catalyst before re-using the catalyst. Such purification of the catalyst from the treating agents is conveniently performed by heating, for instance to about 400° C., whereby the reducing agent and solvent if any is present are completely evaporated or decomposed. Other means as well known to the chemist, such as extraction, could likewise be used to remove the reducing agent from the treated catalyst, though it would also be necessary to heat the catalyst to remove the extracting agent. Two important points are to be observed in carrying out my regeneration process: no residue is to remain on the mass after treatment and the reducing agent must first be applied at ordinary temperature in liquid form, for instance in solution, as a treatment of a spent catalyst with the vapors of the reducing agent does not have the same regenerative effect as a treatment with a liquid preparation.

When the catalyst carrier is insoluble in the solution of the reducing agent used for the regeneration of the active platinum I can simply wash directly the spent catalyst in situ in the converter, impregnating the whole mass with the reducing agent, I then apply heat to evaporate or volatilize the reducing agent and solvent, the temperature used depending on the specific agents used; the mass is then ready for re-use.

It is in many instances preferable and more convenient to remove the spent catalyst from the converter and treat it separately, though the final heating can usually be done in the converter itself.

The treatment of spent platinum contact masses with reducing agents to restore their activity is well adapted for the reactivation of platinized magnesium sulfate pelleted masses as used in the manufacture of sulfuric acid. Such masses are removed from the converters for treatment.

The magnesium sulfate carrier of such masses is soluble in water and it would be impractical to treat such granules or pellets with large amounts of aqueous solutions. I found, however, that in using concentrated aqueous solutions of the reducing agents and spraying such solutions onto the pellets in amounts just sufficient to impregnate the granules or pellets, I obtain a satisfactory action. By this treatment I do not break up or destroy the granules and the wet granules or pellets are then simply returned to the SO₃ converters where on heating the mass recovers its efficiency.

So treated spent masses recover substantially all of their activity by such treatment; they retain their activity for a long period of time and can be reactivated several times.

The present application contains subject matter in common with my application Ser. No. 656,045, filed February 9, 1933.

I claim:

1. The process of regenerating a spent, supported platinum catalyst which comprises impregnating said catalyst with a liquid preparation of a volatile reducing agent and substantially completely removing said liquid preparation from said catalyst.

2. The process of regenerating a spent platinum catalytic mass in which platinum is deposited upon a carrier, which comprises impregnating said mass with a liquid preparation of a volatile reducing agent and heating said catalyst until substantially all of said liquid preparation is removed from said mass.

3. The process of regenerating a spent platinum catalytic mass in which platinum is deposited upon a carrier, which comprises impregnating said mass with an aqueous solution of a volatile reducing agent and heating said catalyst until substantially all of said aqueous solution is removed from said mass.

4. The process of regenerating a spent platinized magnesium sulfate contact mass which comprises spraying a liquid preparation of a volatile reducing agent upon said mass and heating it until substantially all of said liquid preparation is removed from said mass.

5. The process of regenerating a spent platinum catalytic mass which comprises spraying a concentrated aqueous solution of a volatile reducing agent upon said mass.

EARL S. RIDLER.